(12) United States Patent
Lust et al.

(10) Patent No.: US 6,985,109 B2
(45) Date of Patent: Jan. 10, 2006

(54) RECONFIGURABLE APERTURE WITH AN OPTICAL BACKPLANE

(75) Inventors: Lisa M. Lust, Plymouth, MN (US); Paul E. Bauhahn, Fridley, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/830,595

(22) Filed: Apr. 23, 2004

(65) Prior Publication Data

US 2005/0237237 A1 Oct. 27, 2005

(51) Int. Cl.
*H01Q 1/38* (2006.01)
(52) U.S. Cl. .............................. 343/700 MS; 343/754; 343/770
(58) Field of Classification Search ......... 343/700 MS, 343/767, 770, 753, 754, 853; 342/368, 372, 342/375
See application file for complete search history.

(56) References Cited

U.S. PATENT DOCUMENTS

| | | | |
|---|---|---|---|
| 4,554,554 A | 11/1985 | Olesen et al. | 343/895 |
| 5,294,939 A * | 3/1994 | Sanford et al. | 343/836 |
| 6,310,339 B1 | 10/2001 | Hsu et al. | 250/214.1 |
| 6,323,809 B1 | 11/2001 | Maloney et al. | 343/700 MS |
| 6,469,677 B1 * | 10/2002 | Schaffner et al. | 343/876 |
| 6,906,668 B2 * | 6/2005 | Rawnick et al. | 343/700 MS |
| 2002/0014992 A1 * | 2/2002 | Sun et al. | 343/700 MS |
| 2003/0067688 A1 | 4/2003 | Wang | 359/652 |
| 2004/0090365 A1 * | 5/2004 | Newberg et al. | 342/368 |

FOREIGN PATENT DOCUMENTS

| WO | WO 02/099929 | 12/2002 |
|---|---|---|
| WO | WO 03/007427 | 1/2003 |

OTHER PUBLICATIONS

Brown, Elliott R., "On the Gain of a Reconfigurable-Aperture Antenna", IEEE Transactions on Antennas and Propagation, vol. 49, No. 10, Oct. 2001, pp. 1357-1362.

Devlin, Liam, "The Design of Integrated Switches and Phase Shifters", Proc. IEE Tutorial Colloquium on Design of RFICS and MMICS, Nov. 1999, pp. 2/1-2/14.

Freeman, J.L. et al., "Optoelectronically Reconfigurable Monopole Antenna", Electronics Letters, vol. 28, Jan. 1992, pp. 1502-1503.

Maloney, J.C., et al., "Switched Fragmented Aperture Antennas", IEEE Antennas and Propagation Society International Symposium, vol. 1, Jul. 2000, pp. 310-313.

Pringle, Lon N., et al., "The GTRI Prototype Reconfigurable Aperture Antenna", IEEE Antennas and Propagation Society International Symposium, vol. 2, Jun. 2003, pp. 683-686.

Pringle, Lon N., et al., "GTRI Reconfigurable Aperture Design", IEEE Antennas and Propagation Society International Symposium, vol. 1, Jun. 2002, pp. 473-476.

Sainati, Robert A., et al., "A Band-Switched Resonant Quadrifilar Helix", IEEE Transactions on Antennas and Propagation, vol. AP-30, No. 5, Sep. 1982, pp. 1010-1013.

(Continued)

*Primary Examiner*—Hoang V. Nguyen
(74) *Attorney, Agent, or Firm*—Fogg & Associates, LLC

(57) ABSTRACT

A reconfigurable aperture with an optical backplane. In one embodiment a reconfigurable aperture antenna is disclosed. The reconfigurable aperture includes a plurality of vertical cavity surface emitting lasers (VCSEL) and a receiver for each VCSEL. Each receiver is adapted to reconfigure a portion of an aperture in response to an optical feed from an associated VCSEL.

40 Claims, 5 Drawing Sheets

OTHER PUBLICATIONS

Sass, Paul et al., "FCS Communications Technology for the Objective Force", 2002 MITRE Technical Paper.

Schaubert, Daniel H., et al., "Microstrip Antennas with Frequency Agility and Polarization Diversity", IEEE Transactions on Antennas and Propagation, vol. AP-29, No. 1, Jan. 1981, pp. 118-123.

E.W. Jacobs et al., "TST Reconfigurable Aperture RF MEMS for Antenna Applications", Feb. 2004, p. III, 1, 5, 7-8, Publisher: United States Navy, SPAWAR System Center, San Diego, USA, Published in: US.

Lon N. Pringle et al., "The GTRI Prototype Reconfigurable Aperture Antenna", IEEE Antennas and Propagation Society Int'l Symposium, Jun. 22, 2003, pp. 683-686, vol. 4 of 4, Publisher: 2003 Digest APS, Columbus OH, Jun. 22-27, 2003, NY , Published in: US.

Michael L. Vanblaricum, "A Brief History of Photonic Antenna Reconfiguration", International Topical Meeting on Microwave Photonics MWP 2000, Sep. 11, 2000, pp. 9-12, Publisher: Technical Digest, Published in: US.

* cited by examiner

RECONFIGURABLE APERTURE WITH AN OPTICAL BACKPLANE

TECHNICAL FIELD

The present invention relates generally to the reconfiguration of antennas and in particular to a reconfigurable aperture with an optical backplane.

BACKGROUND

Aperture type antennas are operational in a select bandwidth. They work by passing a select amount of energy through one or more apertures (such as a horn, reflector or a lens). Traditionally, aperture type antennas have been passive type antennas. However, increasingly advanced communication systems require antenna systems with capabilities that extend beyond those found in a standard passive type antenna. For example, advanced communication systems may require high data rates, multiple beam apertures, beam steered capacity, agile frequency performance and anti-jamming capability. Active type antennas have been developed to address the needs of these advanced communication systems. These active type antennas typically have a reconfigurable aperture that allows the antenna to change its performance characteristics depending on the shape and size of the aperture.

Reconfigurable aperture antennas require a method of providing the switching aperture with data instructions and power. This must be accomplished without inducing a negative impact on the antennas' radiative characteristics. Since directly integrating a conductive wired network into the radiate face would degrade an antenna significantly, some have in the past tried to utilize high impedance networks to drive voltage into the aperture. However, resistive methods pose several difficult manufacturing challenges and render the aperture rigid and fragile under normal handling. Moreover, the resistive methods typically require the routing of high voltages, induce non-negligible loss in the gain and do not lend themselves to fast reconfiguration times due to parasitic capacitance associated with their layout. Other methods that have been attempted include various wireless techniques such as inductive or optical coupling. Unfortunately, inductive methods also do not enable fast reconfiguration times and often alter the aperture's radiative characteristics making it difficult to predict the antenna pattern. Moreover, past optical methods require that they be supplemented by resistive methods to provide adequate power to operate the reconfiguration electronics. However, as indicated above, resistive methods induce non-negligible losses in the gain and do not do not lend themselves to fast reconfiguration times due to parasitic capacitance associated with their layout.

For the reasons stated above and for other reasons stated below which will become apparent to those skilled in the art upon reading and understanding the present specification, there is a need in the art for an optical interface with a photoconductor that is capable of simultaneously providing fast data rates and sufficient power for operation of a reconfigurable aperture without the limitations of the prior art.

SUMMARY

The above-mentioned problems and other problems are resolved by the present invention and will be understood by reading and studying the following specification.

In one embodiment, a reconfigurable aperture antenna is disclosed. The reconfigurable aperture includes a plurality of vertical cavity surface emitting lasers (VCSEL) and a receiver for each VCSEL. Each receiver is adapted to reconfigure a portion of an aperture in response to an optical feed from an associated VCSEL.

In another embodiment, an optical backplane for a reconfigurable aperture is disclosed. The optical backplane includes a plurality of lasers and a lens for each laser. Each laser is received in a well in the optical backplane. Each lens is optically aligned with an associated laser. Moreover, each lens is further adapted to focus an optical feed from its associated laser to an associated photocell to reconfigure an aperture.

In further another embodiment, a reconfigurable aperture antenna is disclosed. The reconfigurable antenna includes an aperture, an optical backplane and a microcontroller driven network. The aperture includes a RF feed, a matrix of radiating pads, and an application specific integrated circuits (ASICs) coupled to each radiating pad. Select radiating pads are selectively coupled to the RF feed via the ASICs. The optical backplane includes a plurality of vertical cavity surface emitting lasers (VCSELs) and lenses. Each VCSEL is received in an associated well in the optical backplane. Each lens is adapted to provide an optical feed from its associated VCSEL to control one of the ASICS. The microcontroller driven network is coupled to control the plurality of VCSELs.

In yet still another embodiment, a method of reconfiguring an antenna is disclosed. The method comprises generating one or more optical feeds with one or more lasers in an optical backplane and selectively coupling radiating pads in a matrix of radiating pads to an RF feed based on the one or more optical feeds received by one or more receiver circuits.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
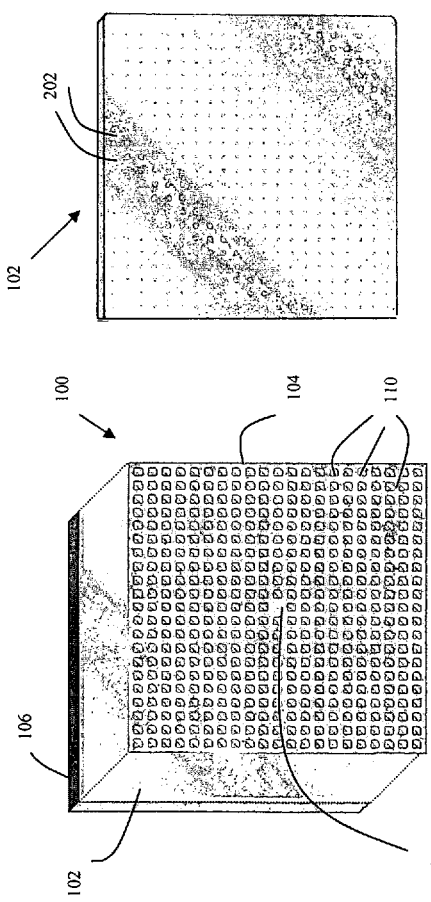
FIG. 1 is a front-perspective view of an optical reconfigurable aperture device of one embodiment of the present invention.

Embodiments of the present invention provide reconfigurable apertures with an optical backplane which can be used in antennas and the like. Referring to FIG. 1, an optical reconfigurable aperture device 100 of one embodiment of the present invention is illustrated. The optical reconfigurable aperture device 100 includes an aperture 104, an optical backplane 102 which is in one embodiment a metal optical backplane 102 and a controller board 106. The Aperture 104 in this embodiment includes a RF feed 108 and a plurality of radiating pads 110 arranged in a matrix. In embodiments of the present invention, select radiating pads 110 are selectively coupled to the RF feed 108 to selectively vary the radiative pattern of the reconfigurable aperture device 100.

Figure 2:
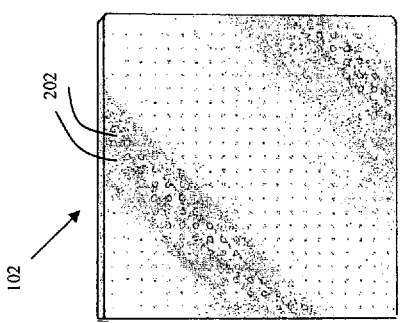
FIG. 2 is a front-perspective view of a optical backplane of one embodiment of the present invention.
Figure 2A:
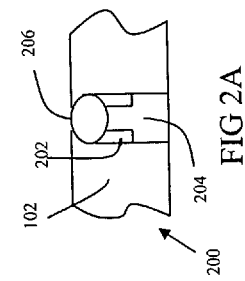
FIG. 2A is a partial cross sectional view of one embodiment of an optical back plane of the present invention.

The optical backplane 102 includes a plurality of wells or holes 202 as illustrated in FIG. 2. Each well 202 is adapted to hold a vertical cavity surface emitter laser (VCSEL) 204 and a lens 206. An example of a VCSEL 204 and lens 206 in a well 202 of one embodiment of the present invention is illustrated in the partial cross-sectional view of the optical backplane 102 in FIG. 2A.

Figure 3:
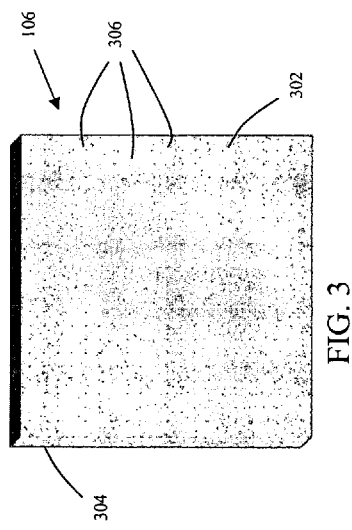
FIG. 3 is a front-perspective view of a controller board of one embodiment of the present invention.

FIG. 3 illustrates one embodiment of a controller board (or ground plane) 106 of the present invention. The front side 302 of the ground plane 106 is positioned adjacent the optical back plane 102 in this embodiment. As illustrated in FIG. 3, the ground plane has a plurality of control pathways 306. At least some of the control pathways 306 are adapted to be aligned with the VCSELs in the optical back plane. The pathways 306 provide a communication path to the VCSELs from the backside 304 of the controller board 106. Through these pathways 306, a microcontroller driven network is in communication with the VCSELs to control when each VCSEL should emit. In this embodiment, the microcontroller driven network is positioned behind the ground plane 106 where it will not interfere with the radiative properties of the antenna.

Figure 4A:
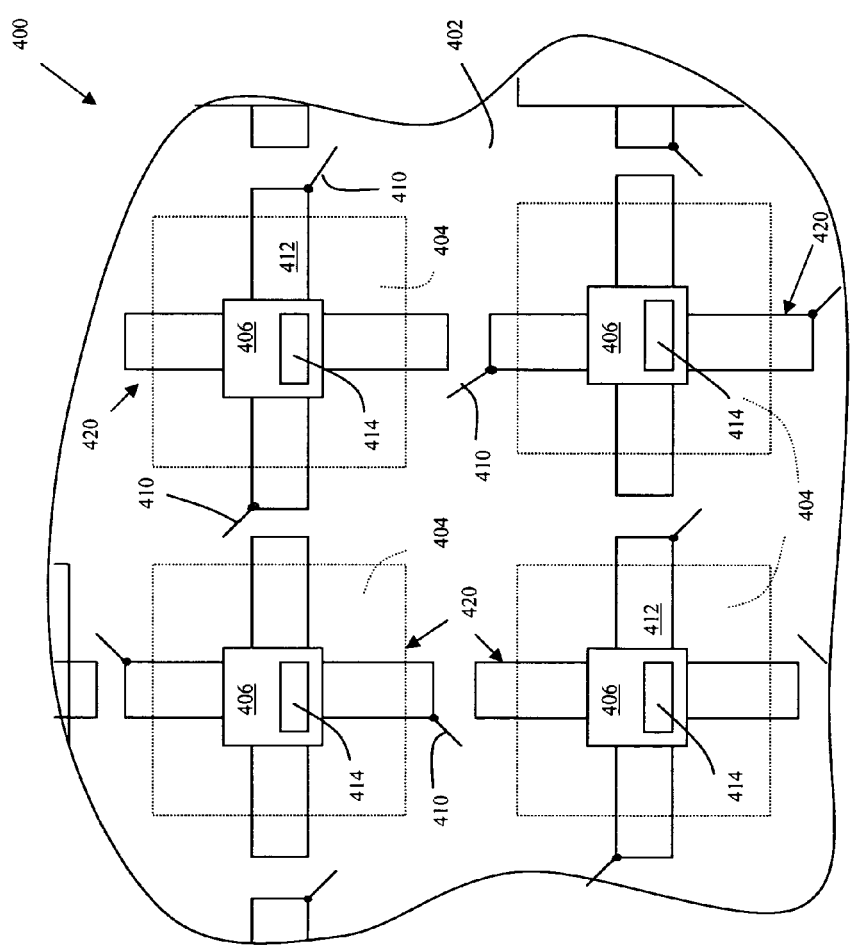
FIG. 4A is partial back view of an aperture of one embodiment of the present invention.

Referring to FIG. 4A, a block diagram illustrating a portion of a backside of an aperture 450 of one embodiment of the present invention is disclosed. As illustrated, the aperture in this embodiment includes a plurality of application specific integrated circuits (ASICs) 420. The ASICs 420 can be referred to as receiver circuits 420. Each ASIC in this embodiment includes a photocell 406, conductive area 412 and two switches 410 which are in communication with the photocell 406. A photocell 406 and an associated switch 410 can be generally referred to as photoconductive switches. The switches 410 are adapted to electrically couple conductive areas 412 of two adjacent ASICs 420 in response to an optical feed received by an associated photocell 406. The receiver circuits 420 (or ASICs) in this embodiment includes a logic circuit 414. The logic circuit 414 is adapted to active one or both associated switches 410 based on a number or duration of pulsed optical feeds received at an associated photocell 406. For example, in this embodiment there would be four different states initiated by pulsed optical feeds. State 1 would indicate that both associated switches 410 are to be closed, state 2 would indicate that both associated switches 410 are to be open, state 3 would indicate that a first one of the switches 410 is to be open while the other second switch is to be closed, and the $4^{th}$ state would indicate that the second of the switches is to be open and the first of the switches is to be closed. Also illustrated in FIG. 4A is radiating pads 404. Each radiating pad is electrically coupled to conductive area 412 of an associated ASIC 420. Since this embodiment, only requires one photo cell and one associated VCSEL per radiating pad 404, it is cost efficient to produce.

Figure 4B:
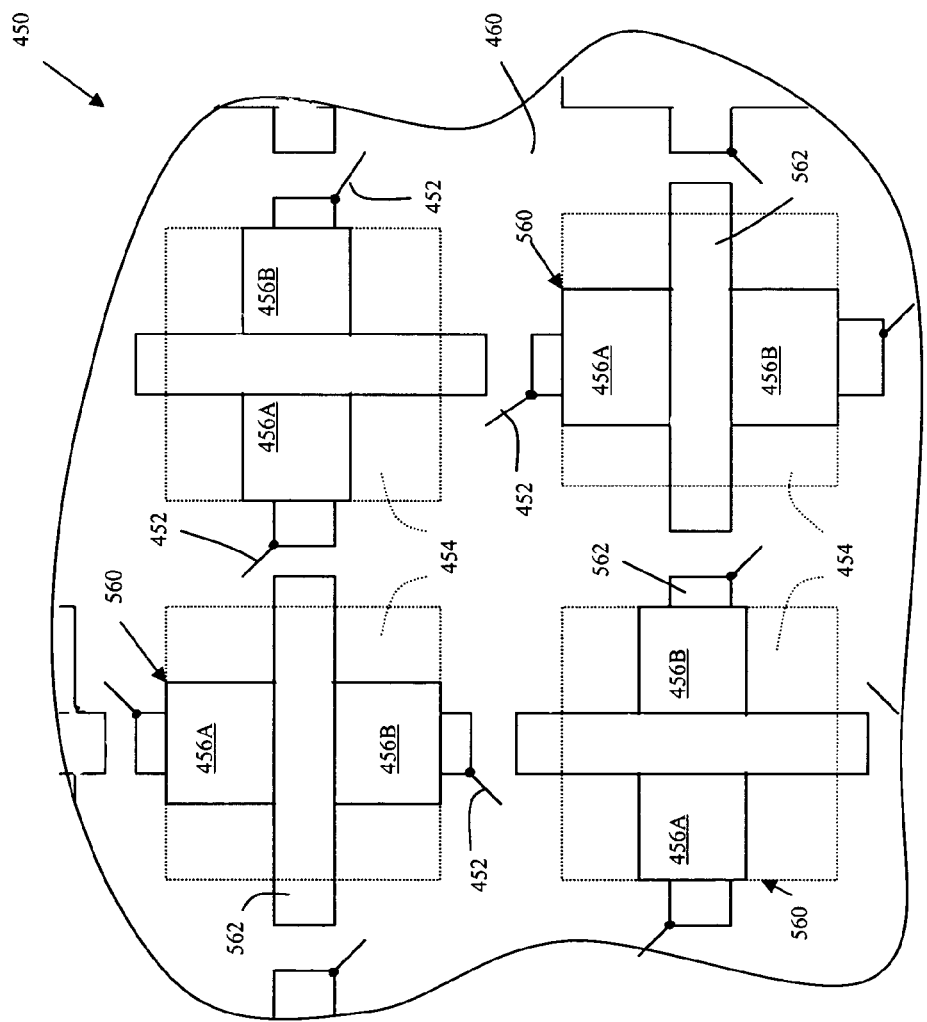
FIG. 4B is partial back view of an aperture of another embodiment of the present invention.

Another embodiment of ASICs 560 of the present invention is illustrated in the block diagram of a backside of aperture 450 in FIG. 4B. In this embodiment, each ASIC 560 includes two photocells 456A and 456B. Each photocell 456A and 456B is adapted to control a single switch 452. Accordingly, in this embodiment, two VCSEL are required to provide two separate optical feeds for each of the two photocells 456A and 456B in each ASIC 560. As in the previous embodiments, each respective switch 452 is adapted to selectively electrically couple conductive areas 562 of adjacent ASICs 560 to each other. Moreover, the conductive area 562 of each ASIC 560 is coupled to an associated radiating pad 454.

As illustrated in the above embodiments, at least one photoconductive switch is placed for each desired connectivity point between individual radiating elements. The photoconductive switches are made from a suitable process to simultaneously enable good power conversion efficiency at the VSCEL wavelength and desired RF switch characteristics which include high isolation and low insertion loss. In one embodiment, the ASIC includes RF switches, photocells and bias circuitry. Moreover, it will be understood in the art that the reconfiguration of the aperture 450 may require the disconnection of adjacent radiating pads 454 by opening respective switches 452 of an associated ASIC 560. The controlling of the opening of the switches 452 is also performed by an optical feed from an associated VCSEL as described above with regard to the closing of an associated switch 452 of various embodiments of the present application.

Figure 6:
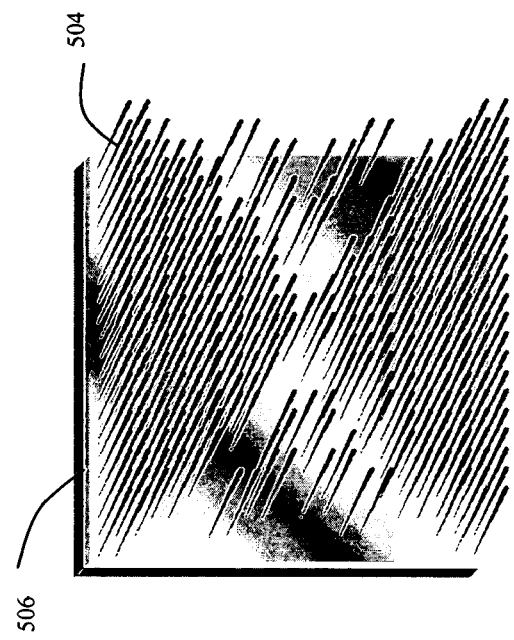
FIG. 6 is a front-perspective view illustrating emitting vertical cavity surface emitter laser in a optical backboard of one embodiment of the present invention.
Figure 5:
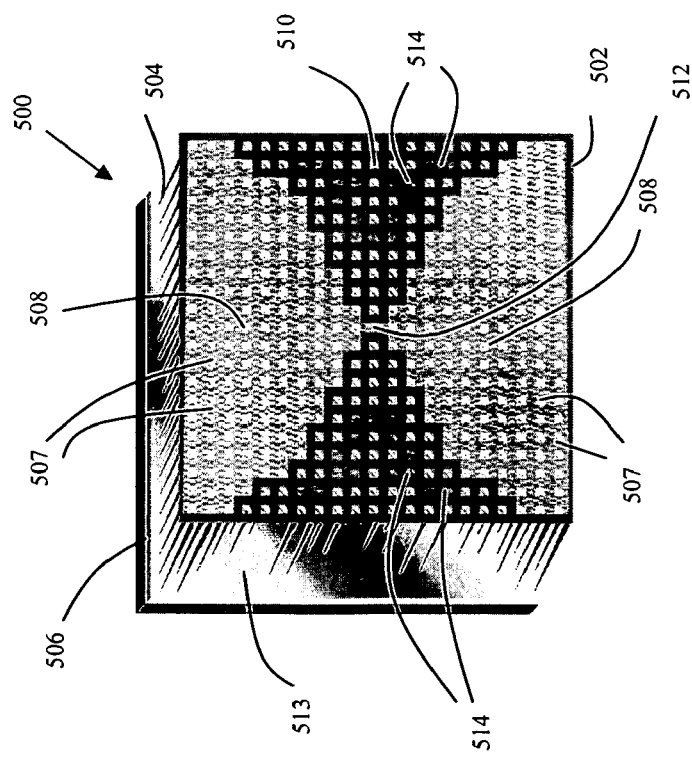
FIG. 5 is a front-perspective view of a reconfigurable device of one embodiment of the present application.

An example of a reconfigurable device 500 of one embodiment of the present invention in use is illustrated in FIG. 5. The reconfigurable device 500 in this example includes an aperture 510, an optical backplane 513 and a controller board 506. As illustrated, the aperture 502 includes radiating areas 508 in this example. Radiating areas 508 are areas in which the associated pads 507 are connected together and to the RF feed 512. Also illustrated, in FIG. 5 are non-radiating areas 510. The non-radiating areas 510 are not connected to the RF feed 512. Further illustrated in this example area are impendence matching areas 514. Impedance matching areas 514 are select pads 507 that are connected together for impedance matching purposes only and are not coupled to the RF feed 512. FIG. 6 illustrates the emitting VCSEL 504 of FIG. 5. They are focused at photocells in the respective ASICs of the aperture 502.

Figure 7:
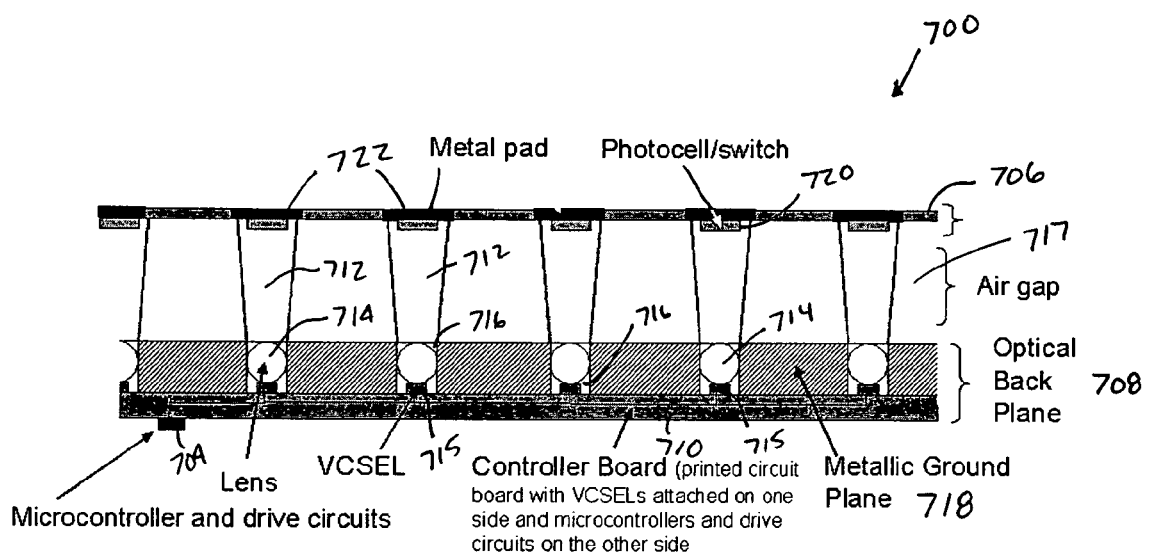
FIG. 7 is a cross-sectional side view of a reconfigurable antenna of one embodiment of the present invention.

FIG. 7 illustrates a side view of a reconfigurable aperture antenna 700 of another embodiment of the present invention. As illustrated, the reconfigurable aperture antenna 700 of FIG. 7 includes an aperture, and optical backplane 708 and a microcontroller network 704 which includes a microcontroller and drive circuits. The optical back plane 708, of this embodiment, includes a metallic ground plane 718 and a controller board 710. Each lens 714 and associated VCSEL 715 is located in an associated well or hole 716 in the metallic ground plane 718. As further illustrated, the microcontroller network 704 is coupled to control each VCSEL 715 though pathways in the controller board 710. As with the other embodiments discussed above, the placement of the microcontroller network 704 behind the controller board 710 has the benefit of not interfering with the radiative properties of the antenna 700. This embodiment also includes an air gap 117 between the optical backplane and the aperture 706 in which the optical feeds 712 travel. As further illustrated, the aperture 706 includes a plurality of metal pads (radiating pads) 722 and associated photocell/switches 720. Each photocell is aligned with an associated optical feed from an associated VCSEL 715. Embodiments of the present invention use the VCSELs 715 to provide one or more optical feeds 712 to associated receiver circuits 720 (i.e. ASICs with photo cells and associated switches) and selectively couple radiating pads in a matrix of radiating pads to a RF feed based on the optical feeds. The microcontroller network 704 controls the optical feeds of the VCESLs.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A reconfigurable aperture antenna comprising:
 a plurality of vertical cavity surface emitting lasers (VCSEL);
 a receiver for each VCSEL, each receiver adapted to reconfigure a portion of an aperture in response to an optical feed from an associated VCSEL.

2. The reconfigurable aperture antenna of claim 1, further comprising:
 a lens adapted to direct an optical feed from each VCSEL to associated receiver.

3. The reconfigurable aperture antenna of claim 1, further comprising:
 an optical backplane having a plurality of wells, each VCSEL being received in a well of the optical backplane.

4. The reconfigurable aperture antenna of claim 1, wherein each receiver further comprises:
 one or more photoconductive switches; and
 bias circuitry.

5. The reconfigurable aperture antenna of claim 1, wherein each receiver further comprises:
 at least one photocell adapted to receive an optical feed from its associated VCSEL; and
 at least one switch in communication with the at least one photocell to selectively reconfigure the aperture.

6. The reconfigurable aperture of claim 1, wherein each receiver further comprises:
 a photocell adapted to receive a pulsating optical feed from its associated VCSEL;
 a first switch adapted to selectively couple a first radiating pad to a second radiating pad;
 a second switch adapted to selectively couple the first radiating pad to a third radiating pad; and
 a logic circuit adapted to control the first and second switches based on the pulsating optical feed received at the photocell.

7. The reconfigurable aperture of claim 1, wherein each receiver further comprises:
 a first photocell adapted to receive a first optical feed from a first VCSEL;
 a first switch adapted to selectively couple a first radiating pad to a second radiating pad;
 a second photocell adapted to receive a second optical feed from a second VCSEL; and
 a second switch adapted to selectively couple the first radiating pad to a third radiating pad.

8. The reconfigurable aperture antenna of claim 1, further comprising:
 a microcontroller driven network coupled to control each of the plurality of VCSELs.

9. The reconfigurable aperture antenna of claim 8, further comprising:
 a controller board positioned between the microcontroller driven network and the plurality of VCSELs, the microcontroller driven network coupled to control each of the VCSELs through pathways in the controller board.

10. An optical backplane for a reconfigurable aperture, the optical backplane comprising:
 a plurality of lasers, each laser received in a well in the optical backplane; and
 a lens for each laser, each lens is optically aligned with an associated laser, each lens is further adapted to focus an optical feed from its associated laser to an associated photocell to reconfigure an aperture.

11. The optical backplane of claim 10, further comprising:
 each laser is further adapted to be controlled by a microcontroller driven network.

12. The optical backplane of claim 10, wherein each lens is received in an associated well in the optical backplane with its associated laser.

13. The optical backplane of claim 10, wherein at least one of the lasers is a vertical cavity surface emitting laser (VCSEL).

14. The optical backplane of claim 10, further comprising:
 a metallic ground plane having the wells to receive the lasers; and
 a controller board having passageways to control the plurality of lasers.

15. A reconfigurable aperture antenna comprising:
 an aperture, the aperture including,
  a RF feed,
  a matrix of radiating pads, and
  an application specific integrated circuit (ASIC) coupled to each radiating pad, wherein select radiating pads in the matrix of radiating pads are selectively coupled to the RF feed via associated ASICs, and
 an optical backplane, the optical backplane including;
  a plurality of vertical cavity surface emitting lasers (VCSELs), each VCSEL received in an associated well in the optical backplane, and
  a lens for each VCSEL, each lens adapted to provide an optical feed from its associated VCSEL to an associated ASIC to control the associated ASIC; and
 a microcontroller driven network coupled to control the plurality of VCSELs.

16. The reconfigurable aperture antenna of claim 15, wherein each lens is received in the well with its associated VCSEL.

17. The reconfigurable aperture antenna of claim 15, further comprising:
 a controller board positioned between the microcontroller driven network and the plurality of VCSELs, wherein each VCSELs is coupled to the microcontroller driven network through the controller board.

18. The reconfigurable aperture antenna of claim 15, wherein each ASIC comprises:
 one or more photoconductive switches; and
 bias circuitry.

19. The reconfigurable aperture of claim 15, wherein the microcontroller driven network further comprises:
 a microcontroller; and
 drive circuits.

20. The reconfigurable aperture of claim 15, wherein the optical backplane further comprises:
 a metallic ground plane having the wells adapted to receive the VCSELs and associated lenses; and
 a controller board, the controller board have passages adapted to be used by the microcontroller driven network to control the VCSELs.

21. The reconfigurable aperture antenna of claim 15, wherein each ASIC comprises:
 at least one photocell responsive to an optical feed from and associated VCSEL; and
 at least one switch in communication with the at least one photocell to selectively reconfigure the aperture by selectively connecting radiating pads in the matrix of radiating pads to the RF feed.

22. The reconfigurable aperture antenna of claim 21, wherein at least one of the at least one switches is an RF switch.

23. The reconfigurable aperture of claim 15, wherein each ASIC further comprises:
 a photocell adapted to receive a pulsating optical feed from its associated VCSEL;
 a first switch adapted to selectively couple a first radiating pad to a second radiating pad;
 a second switch adapted to selectively couple the first radiating pad to a third radiating pad; and
 a logic circuit adapted to control the first and second switches based on the pulsating optical feed received at the photocell.

24. The reconfigurable aperture of claim 15, wherein each ASIC further comprises:
 a first photocell adapted to receive a first optical feed from a first VCSEL;
 a first switch adapted to selectively couple a first radiating pad to a second radiating pad;
 a second photocell adapted to receive a second optical feed from a second VCSEL; and
 a second switch adapted to selectively couple the first radiating pad to a third radiating pad.

25. The reconfigurable aperture of claim 15, further comprising:
 the aperture being spaced from the optical backplane by an air gap.

26. A method of reconfiguring an antenna, the method comprising:
 generating one or more optical feeds with one or more lasers in an optical backplane; and
 selectively coupling radiating pads in a matrix of radiating pads to an RF feed based on the one or more optical feeds received by one or more receiver circuits.

27. The method of claim 26, further comprising:
 focusing each optical feed with a lens on an ASIC.

28. The method of claim 26, further comprising:
 selectively coupling radiating pads of the matrix of radiating pads for impedance matching purposes.

29. The method of claim 26, wherein the optical feeds are produced by one or more vertical cavity surface emitting lasers (VCSELs).

30. The method of claim 29, further comprising:
 controlling the VCSELs with a microcontroller driven network.

31. The method of claim 29, further comprising:
 encasing each VCSEL and associated lens in a well in an optical backplane.

32. The method of claim 26, wherein selectively coupling radiating pads in a matrix of radiating pads to an RF feed further comprises:
 receiving each optical feed at an associated photocell; and
 activating an associated switch based on the optical feed received at the photocell.

33. The method of claim 32, wherein the switch is a RF switch.

34. The method of claim 26, wherein selectively coupling radiating pads in a matrix of radiating pads to an RF feed further comprises:
 receiving pulsing optical feed at an associated photocell; and
 closing one or more switches based on the pulsing optical feed to create an electrical coupling between adjacent conductors.

35. The method of claim 26, wherein selectively coupling radiating pads in a matrix of radiating pads to an RF feed further comprises:
 closing a first switch to connect a first radiating pad to a second radiating pad.

36. The method of claim 35, further comprising:
 closing a second switch to connect the first radiating pad to a third radiating pad.

37. The method of claim 26, further comprising:
 selectively decoupling radiating pads in the matrix of radiating pads.

38. The method of claim 37, wherein selectively decoupling radiating pads in a matrix of radiating pads further comprises:
 receiving pulsing optical feed at an associated photocell; and
 opening one or more switches based on the pulsing optical feed to disconnect an electrical coupling between adjacent conductors.

39. The method of claim 37, wherein selectively decoupling radiating pads in a matrix of radiating pads further comprises:
 opening a first switch to disconnect a first radiating pad from a second radiating pad.

40. The method of claim 39, further comprising:
 opening a second switch to disconnect the first radiating pad from a third radiating pad.

\* \* \* \* \*